Figure 1:
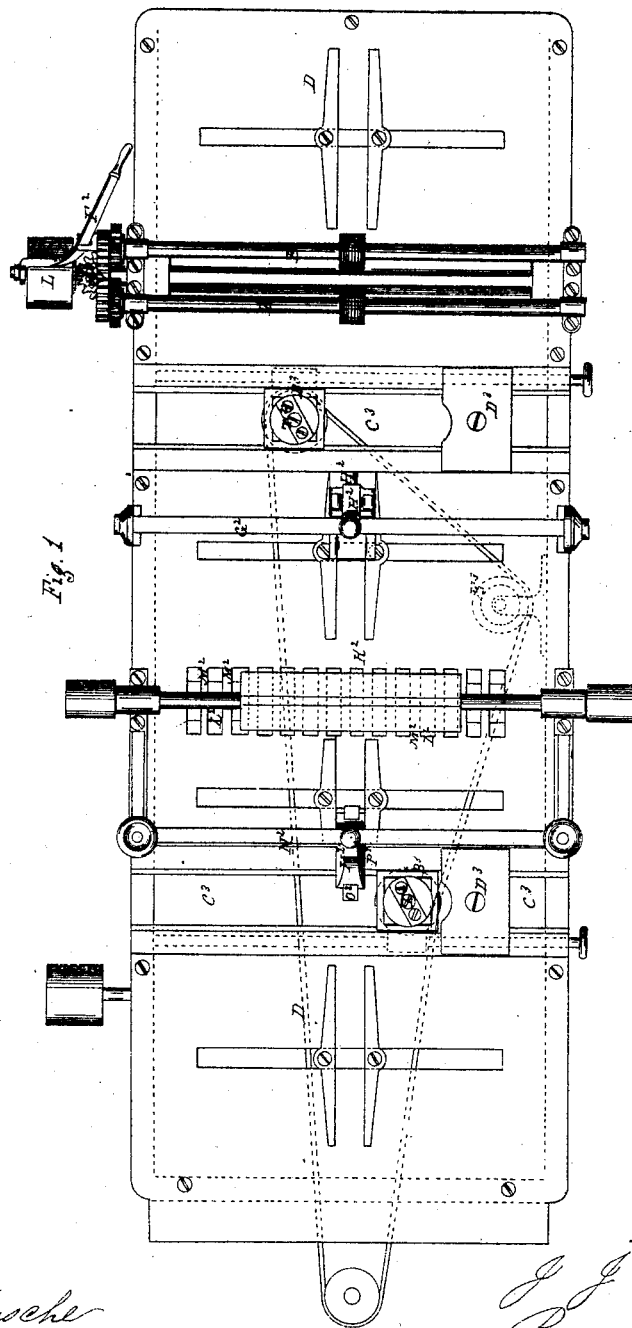

J. J. Russ.
Wood-Planing Mach.
N° 75984    Patented Mar. 24, 1868.

Witnesses
Theo Tusche
Wm Trewin

Inventor
J. J. Russ
Per Munn & Co
Attorneys

J. J. RUSS
Wood-Planing Mach.
Nº 75984      Patented Mar. 24, 1868.
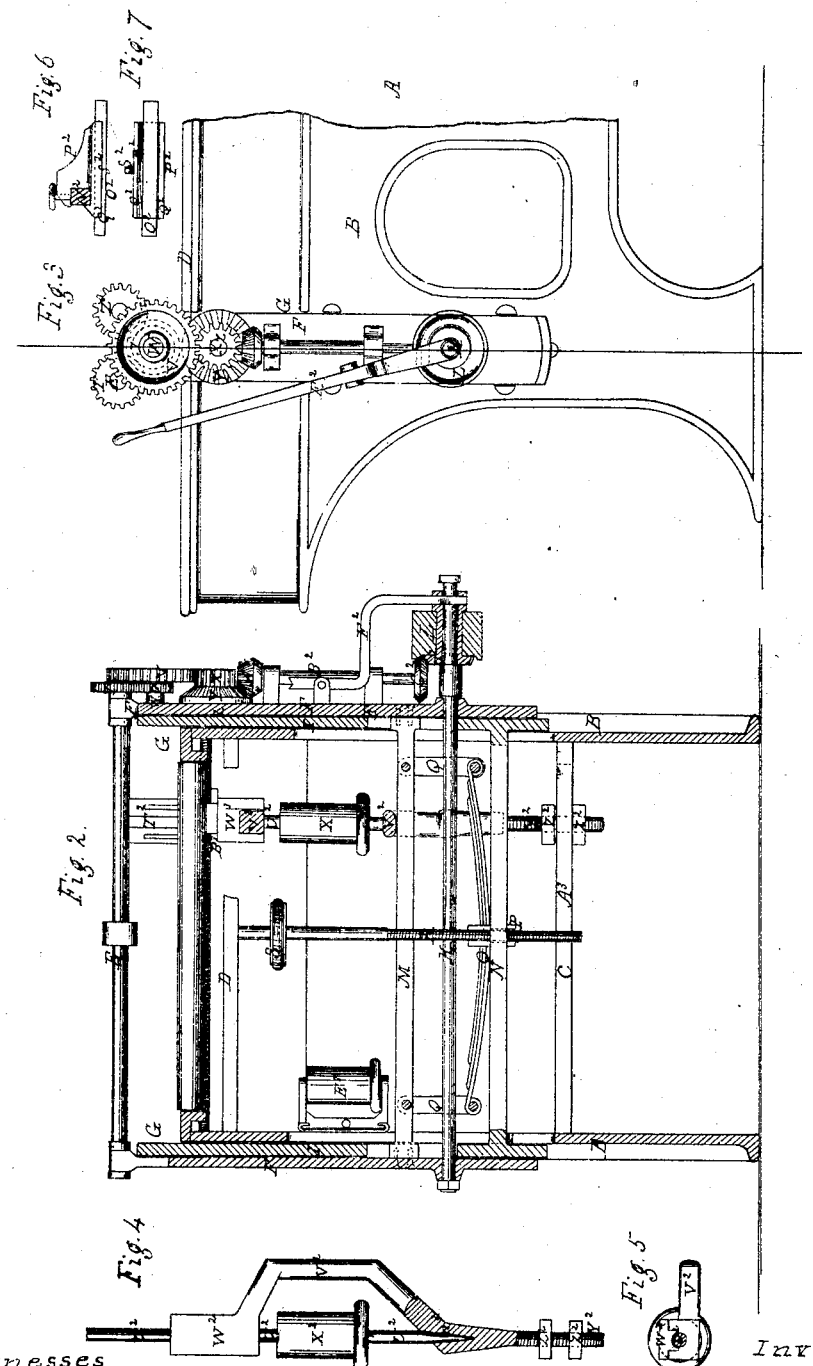
Witnesses,             Inventor,

United States Patent Office.

JAMES J. RUSS, OF WORCESTER, MASSACHUSETTS.

Letters Patent No. 75,984, dated March 24, 1868.

---

IMPROVEMENT IN WOOD-PLANING MACHINES.

---

The Schedule referred to in these Letters Patent and making part of the same.

---

TO ALL WHOM IT MAY CONCERN:

Be it known that I, JAMES J. RUSS, of Worcester, in the county of Worcester, and State of Massachusetts, have invented new and useful Improvements in Wood-Moulding Machines: and I do hereby declare that the following is a full, clear, and exact description thereof, which will enable others skilled in the art to make and use the same, reference being had to the accompanying drawings, forming a part of this specification.

The present invention consists, first, in so hanging a frame in which are arranged the feed-rollers of the moulding-machine to the supporting framework of the machine, that such frame can be raised or lowered, at pleasure, according as may be necessary for properly adjusting the feed-rollers for action upon the "stuff," and also in so constructing such frame as to permit the feed-rollers to yield in case there should be variations in the thickness of the "stuff" passing under the same; second, in hanging the spindle of the side-cutter heads to and in a vertical frame of suitable shape arranged to be moved up and down, and also laterally, for adjusting the cutter-head for action, and at its upper end provided with the box or bearing for the said spindle, whereby, while the side of the cutter-head is susceptible of adjustment for action upon the stuff, the bearing of the box is always upon the same part of the spindle, in lieu of at different points of the same, as with the arrangement of parts heretofore employed, which produces an uneven wear; third, in forming the bed to the machine, where the surface or moulding-cutter head acts, with a series of slots or openings extending in the direction of the movement of the "stuff" having bridge-bars, so as to allow the cutters to act upon the edges of the stuff without danger of striking the bed, and thus being injured; fourth, in hanging the bar carrying the presser-shoe, that is arranged for pressing upon the stuff, just in advance of the point of action thereon by the moulding-cutter head, in such manner to the framework of the machine, that through such frame it can be adjusted in height for a more perfect action of its presser-shoe upon the stuff, and to yield should there be any variations in the thickness of the stuff passing through the machine; fifth, in a novel-constructed clamp for holding the press-block that is located for action upon the stuff after having been cut, or by the moulding-cutter; sixth, in the arrangement, in connection with the pulley-drums of the spindles to the side-cutter heads, of a loose pulley, by means of which the two cutter-heads can be driven with one belt, and both made to turn in the same direction; seventh, providing the openings in the bed-plate, through which the side-cutter heads are arranged to move in a lateral or transverse direction, with a bridge-plate or plates susceptible of adjustment independent of the cutter-heads, whereby an adjustable support to the stuff is given as it passes over the line of such openings.

In the accompanying drawings my improvements in moulding-machines are illustrated—

Figure 1, plate 1, being a plan or top view of a moulding-machine having my improvements applied thereto.

Figure 2, plate 2, a transverse vertical section of the machine at its end where the feed-rollers are located.

Figure 3, plate 2, an elevation of one end to the frame carrying the feed-rolls to the machine.

Figures 4, 5, 6, and 7, plate 2, are detail views to be hereinafter referred to.

Similar letters of reference indicate corresponding parts.

A, in the drawings, represents the supporting framework of the machine, which consists of two parallel upright side-frames, B, that at suitable points are joined together by horizontal brace-rods or bars, C, and at the upper ends by the bed-plate D, over which the "stuff" or wood passes for being acted upon by the cutter-heads used, and thus cut or moulded. E E, two feed-rolls, hung at each end in the upper ends of the vertical side-pieces F of a frame, G, to be now described, as well as its connection to the framework A, and the driving connection between the rollers. These side-pieces F are arranged by a dove-tail strip fixed to their inside face in each case, to move in corresponding dovetail-shaped grooves of plates I, that are arranged, in turn, to move in suitable ways or grooves upon the outside face to the side-frames B. Under the bed D, and near the lower ends of the plates F, there is extended, across from one to the other, a horizontal shaft, K, turning at each end on bearing of the said plate F, that at one end causes a pulley, L, through which the feed-rolls are driven, as will be hereinafter described. This shaft passes through the slots in the inside plates I. M, a bar, extended across from one outside plate F to the other, through the slots of the inner plates I, which bar is fixed at each end to the plates F. N, a bar, below the bar M, and fixed at its ends to the inner plates I. O, a spring, secured at its centre by a screw-loop, P, to the upper side of bar N. This spring extends along the length of the bar N, and at its outer ends is hung to the downward-projecting pieces Q from the under side of the bar M. R, a screw-shaft, provided with a milled flange, S, for convenience in turning it. This shaft R is placed in a vertical position, and at its upper end is arranged to loosely turn in the under side of the bed D, screwing by its lower end through the cross-bar N, hereinbefore referred to, whereby, according as the screw-shaft is turned either to the right or left, the said bar, with the frame to which it is fastened, is raised or lowered, as the case may be, and thus the feed-rolls adapted for operation upon the stuff to be moulded. By the arrangement of side-plates or pieces F and I, to slide the one upon the other, in connection with the spring O, the pressure-rolls are allowed to yield to any variations there may be in the thickness of the pressure under them.

Each feed-roll at one and the same end is provided with a similar pinion-wheel, T, with both of which a pinion-wheel, U, is arranged to engage so as to turn both in the same direction. This wheel U is upon the inside face of a gear-wheel, V, and is concentric therewith, the two wheels turning together upon a common centre-shaft, W, fixed in the outside plate. X, a pinion-wheel, gearing into gear-wheel V. This wheel is fixed to the front face of a bevel-gear wheel, Y, and in connection with such wheel turns upon the fixed centre-shaft Z, of the outside plate F, to the feed-frame G. $A^2$, a bevel-pinion wheel, engaging with bevel-gear wheel and upper end of a vertical shaft, $B^2$, arranged to turn in bearings of the outside plate to the feed-carrying frame. $C^2$, a bevel-gear wheel, in lower end of the shaft $B^2$, just above referred to, through which wheel the feed-rolls, by the arrangement and connection above described, are driven, when the face bevel-gear wheel $D^2$, to the loose driving-pulley L, has been thrown into connection therewith by properly operating the lever-handle $F^2$ therefor. $G^2$, the bar, carrying presser-foot $H^2$, for holding the stuff firmly while being cut by the moulding-cutter head; this presser-foot, in the present instance, being of that class of presser-feet embraced in and secured by Letters Patent issued to me, the 14th day of August, A. D. 1866, and therefore needing no more particular description herein. This bar $G^2$, at each end, is secured to vertical plates, that through inside plates and other parts are similarly arranged for operation and adjustment to that described for the plates carrying the feed-rolls, and for a similar purpose. $K^2$, the part of bed D to machine at which the moulding-cutter head is arranged to act. This part $K^2$ is, in the direction of the length of the bed, provided with a series of slots or openings, $L^2$, separated by bridge-bars $M^2$, whereby the cutters of the cutter-head are allowed to perfectly cut the edges of the stuff without striking against the bed, and thus being injured, from the fact that such openings permit the ends of the cutters to pass below the surface of the bed, while at the same time the bridge-bars give a firm support to the stuff. $N^2$, a presser-bar, carrying the presser-block $O^2$, which block is arranged to bear upon the "stuff" after having been cut by the moulding-cutter head. This block $O^2$ is secured in a hold, $P^2$, between the flanges $Q^2$ upon its under side, by the action of the bent spring $R^2$ that at each end bears against the block $O^2$, pressing it against the flange $Q^2$ opposite thereto, properly operated therefor through the turning in of the set-screw $S^2$ of the holder. $T^2 T^2$, the cutter-heads, arranged to cut upon the side of the stuff as it passes through the machine, the one upon one side and the other upon the other side. $U^2$, the spindles to the cutter-heads, one to each of the same.

For each of these spindles $U^2$ a similar bracket, $V^2$, is provided, having at the upper end a box, $W^2$, in which the spindle turns, and in the socket-bearing $a^2$, at the lower portion to the arm $V^2$, a pulley, $X^2$, being located in the spindle between its two bearings, above described. The lower end of the bracket-arm $V^2$ terminates in a screw-shaft, $Y^2$, having two screw-nuts, $Z^2$, screwed thereon, that when the bracket-arm is placed in the machine, are, the one upon the upper side and the other upon the lower side of a slotted cross-bar, $A^3$, to the side-frame, B, with the box portion to the arm enclosed with a box-slide, $B^3$, arranged to be moved in the transverse opening $C^3$ in the bed-plate. By this arrangement the side-cutter heads can be adjusted in position laterally, and through the proper turning of the screw-nuts $X^2$ in position vertically, while the box is always bearing upon the same part of the spindle—the advantages of which are obvious.

For the openings $C^3$ to the slide-boxes, carrying the spindle-boxes, bridge-plates $D^3$ are provided, that can be moved either to the right or left for a lateral adjustment, and thus produce a support to the stuff as it is passing through the machine. $E^3$, a loose pulley, vertically arranged for turning to the inside face of one of the side-frames B, by means of which one bolt, passing over it and the pulleys to the side-cutter spindles from counter or other suitable driving-shaft, is sufficient for driving such cutter-heads, and in one and the same direction, as is obvious from an inspection of fig. 1, where the belt is shown in red lines.

Having thus described my invention, what I claim as new, and desire to secure by Letters Patent, is—

1. The adjustable frame G, bearing the feed-rollers, and provided with the bars M N, in combination with the spring O; substantially as described for the purpose specified.

2. The frame $V^2$ for the spindle $U^2$, constructed as described, having the box-bearing $W^2$ and the socket-bearing $a^2$, and arranged to operate in connection with the box $B^3$, substantially as described for the purpose specified.

3. The bar carrying the presser-shoe to the machine, when arranged in a frame applied to the machine, for adjustment thereon, and for its own adjustment through a spring, whether both be combined in one or used separately, substantially as and for the purposes described.

4. The clamp or holder for the presser-block, provided with a spring arranged for operating, substantially as and for the purpose described.

5. The bridge-plates or slides $D^3$, for the openings $C^3$, in bed-plates to the machine, in combination with the sliding box $B^3$, substantially as and for the purpose described.

The above specification of my invention signed by me, this 3d day of August, 1867.

JAMES J. RUSS.

Witnesses:
J. C. FRASER,
WM. F. McNAMARA.